United States Patent [19]

Gresham

[11] 3,872,058

[45] Mar. 18, 1975

[54] FLUORINATED POLYURETHANE STAIN REPELLENTS

[75] Inventor: John T. Gresham, Skillman, N.J.

[73] Assignee: AMC Corporation, New York, N.Y.

[22] Filed: Jan. 10, 1974

[21] Appl. No.: 432,173

Related U.S. Application Data

[63] Continuation-in-part of Ser. No. 184,267, Sept. 27, 1971, abandoned.

[52] U.S. Cl. .............. 260/77.5 AM, 117/138.5, 260/33.8 UB, 260/77.5 MA, 210/77.5 AP, 260/633

[51] Int. Cl. .......................................... C08g 22/08

[58] Field of Search........... 260/77.5 AM, 77.5 AP, 77.5 MA

[56] References Cited
UNITED STATES PATENTS

| | | | |
|---|---|---|---|
| 3,380,943 | 4/1968 | Enders et al. | 260/29.2 |
| 3,467,607 | 9/1969 | Kuryla et al. | 260/2.5 |
| 3,591,547 | 7/1971 | Boudakian et al. | 260/32.8 |
| 3,671,493 | 6/1972 | Monaco et al. | 260/75 |

Primary Examiner—Lester L. Lee

[57] ABSTRACT

Fluorinated polyurethanes, useful as stain repellents for textiles, selected from the class consisting of (A) the reaction product formed by sequentially reacting (a) an organic polyol containing 2 to 6 primary or secondary —OH functions, having a molecular weight not exceeding about 2,000 and free of repeating —OCH$_2$CH$_2$— units with (b) Z' moles (Z'=3-6) of an organic diisocyanate to form the adduct B(NCO)$_z'$ wherein J contains 3 to 6 urethane functions and then reacting J(NCO)$_z'$ with (c) 0.3Z' to Z' moles of R$_f$C$_n$-H$_{2n-a}$(OH)$_a$XR'(OH)$_b$ wherein r$_f$ is a perfluoroalkyl group of 4–16 carbon atoms, X=O or S, R' is a alkyl group of 4–16 carbon atoms, X=O or S, R' is a di- or trivalent saturated group which may contain in addition to carbon and hydrogen, an ether or thioether linkage, $n$=1–11, $a$=0–1, $b$=1–2, $a+b$=1, per mole of J(NCO)$_z'$ and optionally reacting any residual isocyanate functions with (d) a component selected from the class consisting of (1) an aliphatic alcohol of 1–18 carbon atoms; (2) an isocyanate blocking agent; (3) a chain extender of the group low molecular weight diols or diamines and (4) a cross-linking agent selected from the class aminoalcohols, diols and triols, and (B) the reaction product formed by reacting (a') an organic polyol selected from the group diols and triols, having a molecular weight not exceeding about 2,000 and free of repeating —OCH$_2$CH$_2$— units with (b') 2–43 moles of an organic diisocyanate per mole of (a') and (c') 2–40 moles of R$_f$C$_n$H$_{2n-a}$(OH)$_a$X-R'(OH)$_b$ wherein $a+b$=2 per mole of (a') and reacting the product of (a'), (b') and (c') with 0–3 moles of (d') per mole of (a') which has the values assigned to (d) aforesaid.

13 Claims, No Drawings

3,872,058

FLUORINATED POLYURETHANE STAIN REPELLENTS

CROSS REFERENCE TO RELATED APPLICATIONS:

This application is a continuation-in-part of application Ser. No. 184,267, filed Sept. 27, 1971 now abandoned.

This invention relates to organic fluorine compounds and in particular to fluorinated polyurethanes for use as textile stain repellents.

It is well known to treat textile materials such as cloth, fabric, fibers and the like in order to reduce their susceptibility to soiling and staining. Among the substances thus far investigated, the organic fluorine compounds, with which the present invention is concerned, have proved especially promising and numerous members have been tested. In general, these entities consist of a fluorinated hydrocarbon or polymeric moiety containing one or more functional groups e.g. hydroxyl, amine, amide, ester, carboxylic acid, sulfonamide, carbamate, urea, urethane and the like.

Although certain of the organic fluorine compounds exhibit satisfactory stain repellency, new structures still are being synthesized and evaluated in the hope of finding practical derivatives of improved effectiveness.

It has now been discovered that a high degree of stain repellency in a textile material can be realized by treating it with a member of a new family of fluorinated polyurethanes selected from the class consisting of (A) the reaction product formed by sequentially reacting (a) an organic polyol containing two to six primary or secondary —OH functions, having a molecular weight not exceeding about 2,000 and free of repeating —$OCH_2CH_2$— units with (b) $Z'$ moles ($Z'$=3–6) of an organic diisocyanate to form the adduct $J(NCO)_{z'}$ wherein B contains three to six urethane functions and then reacting $J(NCO)_{z'}$ with (c) 0.3$Z'$ to $Z'$ moles of $R_fC_nH_{2n-a}(OH)_aXR'(OH)_b$ wherein $R_f$ is a perfluoroalkyl group of 4–16 carbon atoms, X=O or S, R' is a di- or trivalent saturated group which may contain in addition to carbon and hydrogen, an ether or thioether linkage, $n$=1–11, $a$=0–1, $b$=1–2, $a+b$=1, per mole of $J(NCO)_{z'}$ and optionally reacting any residual isocyanate functions with (d) a component selected from the class consisting of (1). an aliphatic alcohol of 1–18 carbon atoms; (2). an isocyanate blocking agent; (3). a chain extender of the group low molecular weight diols or diamines and (4). a cross-linking agent selected from the class aminoalcohols, diols and triols, and (B) the reaction product formed by reacting (a') an organic polyol selected from the group diols and triols, having a molecular weight not exceeding about 2,000 and free of repeating —$OCH_2CH_2$— units with (b') 2–43 moles of an organic diisocyanate per mole of (a') and (c') 2–40 moles of $R_fC_nH_{2n-a}(OH)_aXR'(OH)_b$ wherein $a+b$=2 per mole (a') and reacting the product of (a'), (b') and (c') with 0–3 moles of (d') per mole of (a') which has the values assigned to (d) aforesaid.

The provision of such compounds, their use as stain repellents for treating textiles and the so treated textiles constitute the principal objects and purposes of the invention.

The fluorinated polyurethane stain repellents of the invention are obtained by condensing an organic diisocyanate with the hydroxyl containing components aforesaid. Preferably, the condensation is performed sequentially wherein one of the hydroxyl components is condensed with a diisocyanate to form an intermediate product containing excess isocyanate groups. This product is then reacted further with another of the hydroxyl components to give the final fluorinated polyurethane which may be treated with such optional reactants as a blocking agent, chain extender or cross-linking agent (group $d$ above).

In preparing the fluorinated polyurethanes herein, the reaction is preferably carried out in the presence of an organic solvent and at temperatures of from about room temperature to about 130°C, preferably 45°–100°C. The solvents employed must not contain active hydrogens capable of reacting with isocyanate groups. Suitable solvents include ketones, such as acetone, methyl ethyl ketone, methyl isobutyl ketone, ether, such as dioxane, tetrahydropyran, diethylene glycol dimethyl ether, chlorinated solvents such as methyl chloroform, trichloroethylene, and aromatic liquid hydrocarbons such as toluene, xylene and the like. Mixtures of two or more solvents are often desirable.

The reaction may be accelerated by the use of various catalysts such as tertiary amines e.g. pyridine, triethylene diamine or triethylamine and organometallic compounds e.g. stannous octoate, lead octoate or dibutyltin dilaurate etc. Catalysts are most effective at the later stages of syntheses, particularly in the reaction with a blocking agent, an aliphatic alcohol, a chain extender or a cross-linking agent.

The organic polyols suitable for practicing the invention contain two to six primary or secondary —OH functions and have a molecular weight range not above about 2,000. The preferred molecular weight range is 60 to about 1,000. Polyols of molecular weight above 2,000 offer no advantage and can impair oil repellency. The polyols must be free of repeating oxyethylene units, —($OCH_2CH_2$)$_n$— since these tend to lower water repellency. The polyols may contain repeating oxypropylene units up to about 10–20 per chain.

Typical polyols which may be used in the invention include, ethylene glycol, 1,2-propanediol, 1,3-propanediol, 1,2-butanediol, 1,4-butanediol, 1,10-decanediol, glycerol, 1,2,4-butanetriol, 1,2,6-hexanetriol, trimethylolethane, trimethylolpropane, erythritol, threitol, pentaerythritol, dipentaerythritol, arabitol, sorbitol, 1,4-sorbitan, poly(oxypropylene) glycols, poly(oxypropylene) oxide adducts from low molecular weight polyols, ammonia, primary amines and diamines (such as adducts of glycerol, trimethylolpropane, 1,2,6-hexanetriol, pentaerythritol and ethylenediamine), caprolactone polyol diols and triols prepared from caprolactone and either a diol or triol, and polyester polyols terminated with hydroxyl groups prepared from a dibasic acid and a diol or triol.

A wide variety of aliphatic and aromatic diisocyanates may be used. Preferably, they are unsubstituted and must not contain groups capable of reacting with isocyanate groups. Typical useful diisocyanates are 1,2-ethylene diisocyanate, 1,6-hexylene diisocyanate, lysine diisocyanate, bis(2-cyanato ethyl) fumarate, 1,4-cyclohexylene diisocyanate, methylcyclohexylene diisocyanate, isophorone diisocyanate, 2,2,4-trimethyl-1,6-hexylene diisocyanate, 2,4-tolylene diisocyanate, 2,6-tolylene diisocyanate, 4,4'-diisocyanatodiphenyl ether, 4,4'-diisocyanatodiphenyl methane, 3,3'- dichloro-4,4'-diisocyanatodiphenyl methane, 4,4'-diphenyldiisocyanate, 4,4'-diisocyanatodibenzyl, 3,3'-dimethyl-4,4'-diisocyanatodiphenyl,2,2'-dimethyl-4,4'-diisocyanatodiphenyl, 3,3'-dimethoxy-4,4'-diisocyanatodiphenyl, 2,2'-dichloro-5,5'-dimethoxy-4,4'-diisocyanatodiphenyl, 3,3'-dichloro-4,4'-diisocyanatodiphenyl, 1,3-diisocyanatobenzene, 1,4-diisocyanatobenzene, 1,2-naphthylene diisocyanate, 4-chloro-1,2-naphthylene diisocyanate, 4-methyl-1,2-naphthylene diisocyanate, 1,3-naphthylene diisocyanate, 1,4-naphthylene diisocyanate, 1,5-naphthylene diisocyanate, 1,6-naphthylene diisocyanate, 1,7-naphthylene diisocyanate, 1,8-naphthylene diisocyanate, 4-chloro-1,8-naphthylene diisocyanate, 2,3-naphthylene diisocyanate, 2,7-naphthylene diisocyanate, 1,8-dinitro-2,7-naphthylene diisocyanate, 1-methyl-2,4-naphthylene diisocyanate, 1-methyl-5,7-naphthylene diisocyanate, 6-methyl-1,3-naphthylene diisocyanate, and 7-methyl-1,3-naphthylene diisocyanate.

Examples of the fluorinated hydroxyl-containing compounds are:

$R_f(CH_2)_2S(CH_2)_2OH$
$R_f(CH_2)_4S(CH_2)_2OH$
$R_f(CH_2)_2S(CH_2)_3OH$
$R_fCH_2CH(CH_2OH)SCH_3$
$R_f(CH_2)_3OCH_2CH_2OH$
$R_f(CH_2)_3OCH(CH_3)CH_2OH$
$R_fCH_2CH(CH_3)SCH_2CH_2OH$
$R_f(CH_2)_2SCH(CH_3)CH_2OH$
$R_f(CH_2)_4SCH(CH_3)CH_2OH$
$R_fCH_2CH_2S(CH_2)_{11}OH$
$R_fCH_2CH_2SCH_2CH_2CH_2OH(OH_3)OH$
$R_fCH_2CH_2SC_3H_6OCH_2CH_2OH$
$R_f(CH_2)_3OCH_2CHOHCH_2OH$
$R_f(CH_2)_2CC_3H_6OCH_2CHOHCH_2OH$
$R_f(CH_2)_2SCH_2CHOHCH_2OH$
$R_f(CH_2)_4SCH_2CHOHCH_2OH$
$R_f(CH_2)_2SCH(CH_2OH)CH_2CH_2OH$
$R_f(CH_2)_2SC_3H_6CH(CH_2OH)_2$
$R_f(CH_2)_4SC_3H_6CH(CH_2OH)_2$
$R_fCH_2CHOHCH_2SCH_2CH_2OH$
$R_f(CH_2)_3SCH_2CHOHCH_2OH$
$R_fCH_2CH(C_4H_9)SCH_2CHOHCH_2OH$

The aliphatic alcohol is any primary or secondary monohydric alcohol of from 1 to about 18 carbon atoms and is used to terminate a polyurethane chain. Such aliphatic alcohol can also be used to replace part of the fluorinated alcohol in preparing fluorinated polyurethanes in category (A) supra. This conserves the more costly fluorinated alcohol. The quantity of such aliphatic alcohol which can be used without sacrificing stain repellency will depend on the composition of the chemical makeup of the fluorinated polyurethane.

The isocyanate blocking agent may be any one of those normally used to block isocyanates in urethane technology, for example: aryl alcohols, such as phenol, cresol, o- and p-nitrophenol, o- and p-chlorophenol, naphthol, 4-hydroxy-biphenyl; oximes such as acetone oxime, butanone oxime; aryl mercaptans such as thiophenol, other organic active hydrogen compounds such as diethyl malonate, acetylacetone, ethyl acetoacetate, ethyl cyanoacetate, and eta-caprolactam; and inorganic compounds such as sodium bisulfite and hydroxylamine.

The blocking agents offer a method to increase the durability of treated surfaces through cross-linking and reaction with the surface. These agents react with a free isocyanate group to give temporary adducts which on curing at elevated temperatures regenerate the isocyanate group. They may react in a number of ways. For example, they can react with active hydrogens of polyurethane molecules to give cross-linking thereby increasing molecular weight and solvent resistance, etc. If applied to a substrate with active hydrogens such as cellulose, they form chemical linkages which attach the polyurethane to the substrate.

Chain extending agents are compounds with 2 to about 4 active hydrogens. No more than two active hydrogens may be attached to a single atom. Groups that contain active hydrogens include, —OH, =NH, —NH$_2$, —CO$_2$H, —CO$_2$NH$_2$, —SO$_2$NH$_2$ and —SH. Typical chain extending agents are water, hydrogen sulfide, ethylene glycol, ethylenediamine, 1,2-ethanedithiol, triethanolamine, 2,4-tolylenediamine, and adipic acid. Diamines are preferred. The chain extending agents are used to increase the molecular weight of an isocyanate containing polyurethane by coupling it with at least one other polyurethane unit.

Cross-linking agents include diols, triols, and amino alcohols with one nitrogen atom. Preferred members are ethanolamine, N-methylethanolamine, triethanolamine, trimethylolpropane, etc. These are added last in the synthesis to a polyurethane which contains blocked isocyanate groups. They consume all remaining isocyanate groups giving a polyurethane with terminal, active hydrogens as hydroxyl groups in addition to those present in the polyurethane in urea and urethane linkages. Cross-linking occurs during curing between the blocked isocyanate groups and the active hydrogens present.

As above noted, the herein fluorinated polyurethanes fall into categories (A) and (B) depending on the fluorinated hydroxylic compound used. Category (A) arises from the use of a fluorinated alcohol ($a+b=1$) and category (B) from the use of a fluorinated diol ($a+b=2$).

In category (A) the organic polyol is a triol, tetrol, pentitol or hexitol. The preferred method of preparation involves reacting such a polyol with about 3–6 ($Z'$) moles of a diisocyanate to form an adduct containing on average $Z'$isocyanate groups, $J(NCO)_{Z'}$. The preferred diisocyanates are those in which the two isocyanates differ in reactivity such as 2,4-tolylene diisocyanate and isophorone diisocyanate.

The adduct is reacted with a fluorinated alcohol chosen from $R_fC_nH_{2n-a}(OH)_aXR'(OH)_b$ where $a+b=1$. The amount of alcohol used is from $0.3Z'$ to $Z'$ moles per mole of $J(NCO)_{Z'}$, preferably from about $0.5Z'$ to $0.8Z'$.

When unreacted isocyanate groups remain they may be left unreacted or partially or completely reacted with $0$–$0.7Z'$ moles of either an isocyanate blocking agent, an aliphatic alcohol, a chain extender, a cross-linking agent or a mixture of these. It is preferred that at least some of the unreacted isocyanate groups are reacted further.

When an isocyanate blocking agent is used, preferably at least one mole of blocking agent per mole of polyol diisocyanate adduct is used. The amount of aliphatic alcohol is not critical and may be omitted. It is used to minimize the amount of fluorinated alcohol. The amount is chosen so as to not interfere with oil repellency. When a chain extender is used no more than about one mole of extender per mole of adduct should be used, usually about 0.5 mole.

A cross-linking agent may or may not be used in conjunction with a blocking agent. When it is used the amount is chosen to provide on average at least about one hydroxy group per molecule of the polyurethane. The cross-linking agent is added last to the polyurethane which has on average one remaining isocyanate group (after the fluorinated alcohol and, if any, after the blocking agent, aliphatic alcohol and chain extender have reacted).

When no isocyanate blocking agent is used in conjunction with the cross-linking agent the resulting polyurethane is blended with a blocked di- or polyisocyanate such as polymethylene-polyphenylene isocyanate such that there is at least about one blocked isocyanate group for each hydroxyl group. On curing this mixture, isocyanate groups will be generated which will react with the hydroxyl groups and other active hydrogens present to give a cross-linked polyurethane of higher molecular weight and greater durability.

The manner in which these polyurethanes can be prepared is not restricted to only one method. For example, after the preparation of the adduct, $J(NCO)_z'$, the fluorinated alcohol, blocking agent, aliphatic alcohol and chain extender may be added all at once or in a stepwise manner. In most cases the fluorinated alcohol is added first. After it has reacted the others are added with the chain extender usually being added last. If a cross-linking agent is used it is added after the chain extender.

Category (B) comprises polyurethanes synthesized from a fluorinated diol, $R_fC_nH_{2n-a}(OH)_aXR'(OH)_b$ where $a+b=2$, a polyol, a diisocyanate and one or more of the following: an isocyanate blocking agent, a chain extender or a cross-linking agent. The polyol is a diol or triol of molecular weight not exceeding about 2000 preferably from 60 to about 1,000 and which does not contain repeating oxyethylene units. The polyol may be a mixture of the two. These polyurethanes contain one or more of the following units:

$$-(F)\frac{}{c}D-(F)\frac{}{c}$$

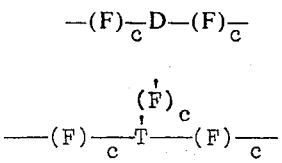

where F is a fluorinated segment prepared from the fluorinated diol, D and T are a nonfluorinated segment prepared from the above diol or triol respectively and $c$ is 2–40, preferably 3–16, or it may contain these segments in a random fashion. The non-random or ordered polyurethane is preferred. The segments are connected through urethane linkages furnished by a diisocyanate.

The ordered polyurethanes may be prepared in several ways and are considered block copolymers. In one method a one to one adduct is first formed between the fluorinated diol and a diisocyanate. For example:

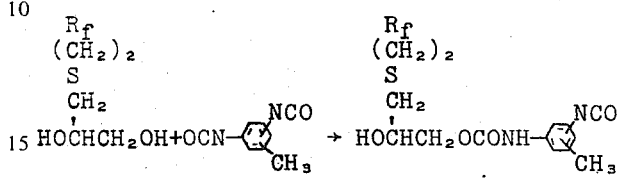

A 2:1 or 3:1 adduct of a diisocyanate and a diol or triol respectively is prepared, for example:

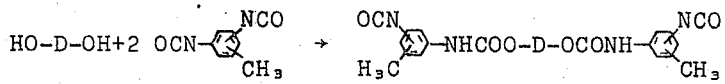

where DOH is a diol as described above. Next 2c moles of the fluorinated adduct are reacted with one mole of the diol adduct (3c if one mole of a triol adduct is used) to obtain a polyurethane with terminal isocyanate groups. Based on the above examples its structure may be represented by the formula:

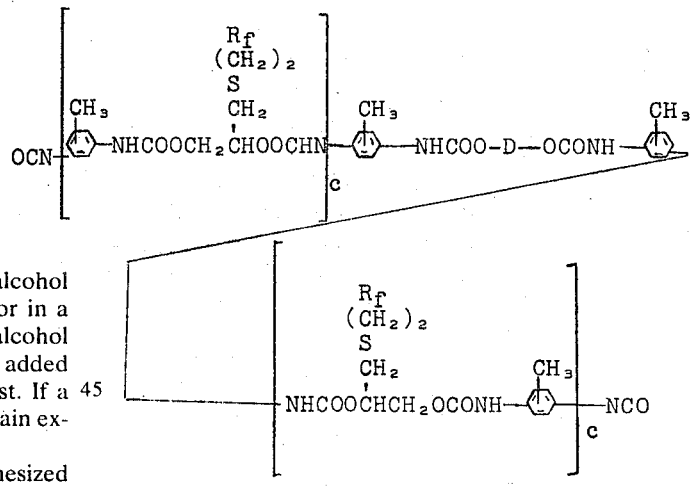

The remaining isocyanate groups may be left totally or partially unreacted or they may be reacted with one or more of the following, an isocyanate blocking agent, a chain extending agent and a cross-linking agent, to obtain the final product. The amount of blocking agent that may be used is from 0–2 moles per mole of diol and 0–3 moles per mole of triol used. The preferred amount of blocking agent is at least 0.5 mole per mole of diol or triol.

The amount of chain extending agent is about 0.5 to less than 1.0 mole per mole of either diol or triol. The amount of cross-linking agent when used is chosen to give an average of about at least one hydroxyl group per mole of polyurethane.

Alternatively the ordered or segmented polyurethane can be prepared with terminal hydroxyl groups. In this case the fluorinated adduct is reacted with the diol or triol directly. Using the above example the structure of the product may be represented by

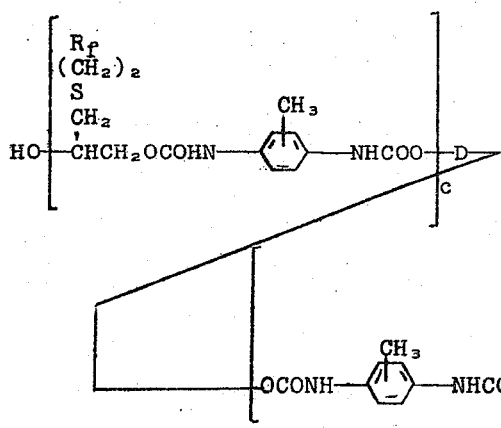
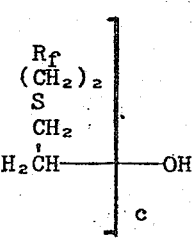
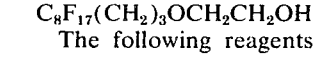

This polyurethane may be converted to a product similar to that above terminated with isocyanate groups by reacting it with two moles of a diisocyanate. The resulting polyurethane may then be converted to the final product as already described.

The hydroxyl terminated polyurethane may also be reacted with one or two moles of a partially blocked di- or polyisocyanate. A diisocyanate is preferred. Such a blocked isocyanate contains with at least one of the hydroxyl groups of the polyurethane to form a urethane linkage. The resulting polyurethane contains 0–1 hydroxyl group and at least one blocked isocyanate group. On curing a high molecular weight polyurethane is formed.

The hydroxyl terminated polyurethane may also be mixed with a completely blocked di- or polyisocyanate as described earlier for polyurethanes prepared from fluorinated alcohols.

The fluorinated polyurethanes may also be prepared by a method in which the arrangement of F and D segments is more random. In this method the fluorinated diol, a diisocyanate and a diol are mixed in the molar ratio of $2c/(2c$ to $2c + 2)/1$, and reacted. When a triol is used the molar ratio is $3c/(3c$ to $3c + 3)/1$. When $2c$ (or $3c$) moles of diisocyanate are used the polyurethane is terminated in hydroxyl groups and when $2c + 2$ (or $3c + 3$) moles of diisocyanate are used it is terminated in isocyanate groups.

These polyurethanes are then converted to final products as already described for those prepared by the more ordered synthesis.

Reference is now made to the following non-limiting examples.

PREPARATION OF FLUORINATED ALCOHOLS

EXAMPLE 1

$C_8F_{17}(CH_2)_3OCH_2CH_2OH$ $C_8F_{17}CH_2CHICH_2OCH_2CH_2OH$

Perfluorooctyl iodide (224 g, 0.41 moles), washed free of iodine with sodium bisulfite was placed in a three-necked flask equipped with a thermometer, nitrogen inlet, condenser, stopper and bubbler. Freshly distilled allyloxyethanol (43 g, 0.42 moles) and ABN [azobis(isobutyronitrile)] (0.7 g, 0.04 moles) were added. The flask and contents were heated to 85°–90°, at which point the reaction became exothermic. At 105° the evolution of heat became extremely rapid and the temperature rose quickly to about 140°. Stirring was continued and the reaction allowed to cool to 95°. Heating was resumed and the reaction maintained at this temperature for 2 hours. Addition of 0.34 g (0.002 moles) of ABN at this point did not produce an exotherm. Heating was resumed for 2 hours and a like amount of ABN again added. After 4 more hours the reaction was stopped and allowed to stand overnight. The reaction mixture was distilled, removing 81 g of unreacted starting materials and leaving 184 g (70%) of product which solidified on cooling. The unreacted starting materials were reacted to give an additional 48 g of product for a total yield of 232 g (88%).

$C_8F_{17}(CH_2)_3OCH_2CH_2OH$

The following reagents were placed in a 1-gallon stirred autoclave: $C_8F_{17}CH_2CHICH_2OCH_2CH_2OH$ (292 g, 0.45 moles), potassium carbonate (69 g, 0.5 moles), 5% palladium on charcoal, 30 g, absolute ethanol, 1,000 ml. The autoclave was filled with hydrogen at a pressure of 800 psi. After stirring for 21 hours at 60° the pressure dropped to 740 psi and the reaction was stopped. The catalyst was removed by filtration, the solvent evaporated under reduced pressure and the residue taken up in ether. The ether solution was washed with water and dried over magnesium sulfate. The drying agent was removed by filtration and the solvent was removed from the filtrate by evaporation leaving 217 g (0.415 moles) of dark yellow liquid having $n_D^{25}$ 1.3435. The infrared spectrum showed neither the presence of a C-I bond nor unsaturation. The material was distilled on a spinning band column giving 171 g (0.33 moles, 73%) of purified material with a boiling point of 134° at 8.4 mm pressure.

EXAMPLE 2

$C_8F_{17}(CH_2)_3OCH(CH_3)CH_2OH$ $C_8F_{17}CH_2CHICH_2OCH(CH_3)CH_2OH$

One hundred eleven grams of a mixture of about 5% $C_6F_{13}I$, 85% $C_8F_{17}I$ and 10% $C_{10}F_{21}I$, 23.2 g of 2-allyloxy-1-propanol (D. Swern et al, J. Am. chem. Soc., 71, 1152 (1949)) and 0.3 g of azobisisobutyronitrile (ABN) were heated under nitrogen at 70° for 4 hr. An additional 0.15 g of catalyst was added and the mixture heated overnight. The unreacted material (47 g) were removed by distillation at reduced pressure leaving 86.3 g of adduct. The unreacted materials were re-reacted with 0.11 g. of catalyst and yielded 36.6 g of additional adduct, total 122.9 g.

Anal. % I Calcd: 19.2. Found: 20.5.

$C_8F_{17}(CH_2)_3OCH(CH_3)CH_2OH$

A mixture of 61.5 g of n-$C_8F_{17}CH_2CHICH_2OCH(CH_3)CH_2OH$, 6.1 g 5% palladium on charcoal, 225 ml of absolute ethanol and 13.8 g of powdered, anhydrous potassium carbonate was hydrogenated at 50 psi on a Parr shaker. The solids were removed by filtration and the filtrate evaporated. The residue was dissolved in methylene chloride. The organic solution was washed with water, dried and stripped at reduced pressure to isolate the product. The reaction was repeated. The combined products totaled 88.9 g. Distillation gave six fractions.

| Fraction | Boiling Point (°C) | Pressure (mm Hg) | Weight (g) |
|---|---|---|---|
| 1 | 120–125 | 7.5 | 0.7 |
| 2 | 125–130 | 7.5 | 7.2 |
| 3 | 130–132 | 7.5 | 16.1 |
| 4 | 132–134 | 7.5 | 35.4 |
| 5 | 134 | 7.5 | 20.2 |
| 6 | 134–121 | 7.5 – 5 | 4.6 |

Fractions 3, 4 and 5 were analyzed by gas chromatography. Fraction 3 contained 8.7% of the $C_6F_{13}$- alcohol, 82.6% $C_8F_{17}$- alcohol and 1.4% $C_{10}F_{21}$- alcohol. Fraction 4 contained 1.9% of the $C_6F_{13}$- alcohol, 90.1% $C_8F_{17}$- alcohol and 2.4% $C_{10}F_{21}$- alcohol. Fraction 5 contained 1.5% $C_6F_{13}$- alcohol, 87.1% $C_8F_{17}$- alcohol and 7.2% $C_{10}F_{21}$- alcohol. Other related alcohols were present in these fractions.

EXAMPLE 3

$C_8F_{17}(CH_2)_2S(CH_2)_2OH$

A 5-liter, three-neck flask fitted with a condenser, a mechanical stirrer and an addition funnel was charged with 83.6 g of potassium hydroxide pellets and 400 ml of 95% ethanol. To this solution was added a mixture of 101 g of 2-mercaptoethanol and 150 ml of 95% ethanol. After stirring for 15 minutes, a solution of 690 g of $R_fCh_2CH_2I$ (4.0% $C_6F_{13}(CH_2)_4I$, 4.3% $C_8F_{17}(CH_2)_4I$ and 0.3% $C_{10}F_{21}(CH_2)_4I$) in 1850 ml of warm 95% methanol was added in a few minutes at about 45°. The reaction temperature was maintained at 40°–50°for about 2 hours. The reaction was neutralized with acetic acid and distilled removing most of the ethanol. The residue was taken up in about one liter of chloroform filtered and washed with water. The chloroform solution was dried over magnesium sulfate and stripped collecting a yellow solid. Gpc analysis showed 4.6% $C_6F_{13}(CH_2)_2S(CH_2)_2OH$, 80.4% $C_8F_{17}(CH_2)_2S(CH_2)_2OH$, 7.0% $C_{10}F_{21}(CH_2)_2S(CH_2)_2OH$, 0.3% $C_6F_{13}(CH_2)_4S(CH_2)_2OH$, 5.1% $C_8F_{17}(CH_2)_4S(CH_2)_2OH$, and 0.4% $C_{10}F_{21}(CH_2)_4S(CH_2)_2OH$.

EXAMPLE 4

$C_8F_{17}(CH_2)_2S(CH_2)_3OH$

To a stirred solution of 7.5 g (0.33 mole) of sodium in 250 ml of absolute ethanol in a nitrogen atmosphere was added over a ten-minute period 144 g (0.30 mole) of $R_fCH_2CH_2SH$ (prepared from $R_fCH_2CH_2I$ and thiourea, approximately 95% is $R_fCH_2CH_2SH$ and 5% $R_f(CH_2)_4SH$ and in which $R_f$ is about 5% $C_6F_{13}$, 90% $C_8F_{17}$ and 5% $C_{10}F_{21}$) in 50 ml of absolute ethanol. After 15 minutes at 50°C, 31.5 g (0.33 mole) of 3-chloro-1-propanol was added and the mixture refluxed for 4 hours. The mixture was filtered and the solvent evaporated. Ethyl acetate was added to the solid residue and the solution was washed twice with water. The solution was dried over magnesium sulfate, filtered, and evaporated to give 148.3 g of a tan solid. Analysis by gas chromatography indicated 3.1% $C_6F_{13}(CH_2)_2S(CH_2)_3OH$   1.3% $C_6F_{13}(CH_2)_4S(CH_2)_3OH$
83.4% $C_8F_{17}(CH_2)_2S(CH_2)_3OH$   4.1% $C_8F_{17}(CH_2)_4S(CH_2)_3OH$
4.1% $C_{10}F_{21}(CH_2)_2S(CH_2)_3OH$   1.7% $C_{10}F_{21}(CH_2)_4S(CH_2)_3OH$

EXAMPLE 5

$C_8F_{17}CH_2CH(CH_2OH)SCH_3$ $C_8F_{17}Ch_2CHICH_2OH$

A mixture of 327.6 g (0.6 mole) of 1-iodoperfluorooctane, 35.1 g (0.6 mole) of allyl alcohol, and 1 g of azobis(isobutyronitrile) was stirred at 75° for 4 hours. No exotherm was noted. Another 0.5 g of catalyst was added and the reaction continued overnight. The product was then freed of volatiles under reduced pressure. The residues m.p. 85°–88° weighed 199 g. The distilled liquid (163.3 g) was treated again with azobis(isobutyronitrile) as above giving an additional 69.3 g of product. The total yield was 74% plus another 90 g of distillate which could be recycled. By gas chromatography, the product was 86.9% pure $C_8F_{17}$ homolog with 4.3% $C_6F_{13}$ and 4.8% $C_{10}F_{21}$.

$C_8F_{17}CH_2CH(CH_2OH)SCH_3$

To a solution of 14.4 g (0.22 mole) of 85% potassium hydroxide in 250 ml of 95% ethanol was bubbled in 25 g (0.5 mole) of methyl mercaptan (measured by weight loss of cylinder). Then a solution of 120.8 g (0.2 mole) of heptadecafluoro-2-iodoundecanol in 100 ml of ethanol was added to the above solution slowly with stirring. After stirring 24 hours at room temperature, the mixture was neutralized with acetic acid, the solvent distilled off, the residue taken up in ethyl acetate, washed with 5% sodium hydroxide solution and water, and dried over magnesium sulfate. After removing the solvent, the residue was distilled, collecting 73.8 g (70%) of a white solid, m.p. 38°–39° at b.p. 89° (0.8 mm). A small sample was recrystallized from hexane to give white flakes, m.p. 39°, 97% pure by gas chromatography.

Anal. Calcd for $C_{12}F_{17}H_9OS$: % C, 27.49; H, 1.73; S, 6.12. Found: % C, 27.17; H, 2.50; S, 6.62; I, O.

EXAMPLE 6

$C_8F_{17}(CH_2)_2S(CH_2)_{11}OH$

A mixture of 108 g (0.255 mole) of heptadecafluorodecanethiol and 38.4 g (0.225 mole) of 10-undecenol was heated to 60°, upon which the liquids became miscible and 0.39 g of azobis(isobutyronitrile) added. An exothermic reaction raised the temperature to 83°. When the temperature had dropped to 75°, another 0.2 g of catalyst was added and the solution heated to 85° for 5 hours. The mixture was then heated to 160° (0.03 mm) to remove unreacted starting materials and the residue distilled collecting 134.3 g (92%) at 156° (0.1 mm), m.p. 79°.

Anal. Calcd. for $C_{21}H_{27}F_{17}OS$: % C, 38.77; H, 4.18; S, 4.92. Found: % C, 38.68; H, 4.24; S, 5.26.

PREPARATION OF FLUORINATED DIOLS

EXAMPLE 7

$C_8F_{17}CH_2CH_2CH_2OCH_2CHOHCH_2OH$ $C_8F_{17}CH_2CHICH_2OCH_2CHOHCH_2OH$

A mixture of 109.2 g (0.2 mole) of 1-iodoperfluorooctane, 26.4 g (0.2 mole) of 3-allyloxypropanediol, and 0.3 g of azobis(isobutyronitrile) was heated to 70° for 22 hours. Two additional 0.15 g portions of catalyst were added during the reaction. The unreacted starting materials were removed by distillation by heating to 120° (0.05 mm). The crude yield was 115 g (85%).

Anal. Calcd for $C_{14}F_{17}H_{12}IO_3$: % I, 18.71. Found: 18.78.

$C_8F_{17}CH_2CH_2CH_2OCH_2CHOHCH_2OH$

A mixture of 51 g (0.075 mole) of $C_8F_{17}CH_2CHICH_2OCH_2CHOHCH_2OH$, 12.5 g of powdered anhydrous potassium carbonate, 5 g of 5% palladium on charcoal, and 200 ml of absolute ethanol was hydrogenated in a Parr apparatus at 50 lb/in². The pressure loss was 8 lb. The catalyst was removed by filtration, the solvent evaoporated, and the residue taken up in ethyl acetate. After washing and drying, the solvent was removed to leave 38 g (92%) of white solid, m.p. 55°. The iodine analysis was 0.11%.

EXAMPLE 8

$C_8F_{17}(CH_2)_2SC_3H_6OCH_2CHOHCH_2OH$

A mixture of 24 g (0.04 mole) of $C_8F_{17}CH_2CH_2SH$ (prepared from $C_8F_{17}CH_2CH_2I$ and thiourea), and 6.6 g (0.05 mole) of allyloxypropanediol (not miscible) reacted when heated to 50°, although no catalyst was present. The temperature rose to 67°. As the temperature dropped, the mixture solidified and was rewarmed to 80° to melt. At the end of the day, 0.09 g of azobis(isobutyronitrile) was added and the liquid stirred overnight at 90°. In the morning, the mixture has solidified. It was heated to 150° (0.07 mm) (bath temperature) to remove unreacted substances. The yield of white solid, m.p. 91°, was 28.5 g (93%).

Anal. Calcd for $C_{16}F_{17}H_{16}O_3S$: % S, 5.23. Found: % S, 5.64.

EXAMPLE 9

$C_8F_{17}(CH_2)_2SC_3H_6CH(CH_2OH)_2$ $C_8F_{17}(CH_3)_2SC_3H_6CH(CO_2C_2H_5)_2$

A mixture of 96 g (0.2 mole) of $C_8F_{17}CH_2CH_3SH$ (90.1% $C_8F_{17}CH_2CH_2SH$, 1.4% $C_{10}F_{21}CH_2CH_2SH$, 5.6% of $C_8F_{17}(CH_2)_4SH$ and 1.4% $C_{10}F_{21}(CH_2)_4SH$), 40 g (0.2 mole) of diethyl allylmalonate, and 0.15 g of azobis(isobutyronitrile) was heated to 65°, at which point an exotherm increased the temperature to 78°. When the temperature had dropped to 65°, another 0.07 g of catalyst was added, and 5 hours later at the end of the day, another 0.07 g was added. The mixture was then heated overnight at 67°. The mixture was then heated to 160° (0.5 mm) (bath temperature) to remove nonreactants. The yield of crude product was 122.5 g (90%).

Anal. Calcd for $C_{20}F_{17}O_4S$: % C, 35.30; H, 3.11; S, 4.71. Found: % C, 36.09; H, 3.33; S, 5.28.

$C_8F_{17}(CH_2)_2SC_3H_6CH(CH_2OH)_2$

A solution of 51 g (0.075 mole) of $C_8F_{17}(CH_2)_2SC_3H_6CH(CO_2C_2H_5)_2$ in 150 ml of dry ether was added over 0.75 hr to a solution of (5.7 g (0.15 mole)) of lithium aluminum hydride in 350 ml of dry ether. After 4 hours stirring at reflux, another gram of hydride was added and the reaction continued overnight. The reaction was continued another 48 hours adding 2 g more of hydride each morning. Excess hydride was decomposed with ethyl acetate followed by 600 ml of 10% sulfuric acid. The ether layer was washed, dried and the solvent evaporated. The yield of crude product was 38.6 g which was recrystallized from benzene to give 16.2 g (36%) of a white fluffy powder, m.p. 90°–91°.

Anal. Calcd for $C_{16}F_{17}H_{17}O_2S$: % C, 32.19; H, 2.88; S, 5.38. Found: % C, 32.16; H, 3.37; S, 5.81.

EXAMPLE 10

$C_8F_{17}CH_2CH_2SCH(CH_2OH)CH_2CH_2OH$

A mixture of 12 g (0.05 mole) of $C_8F_{17}CH_2CH_2SH$, 2.2 g (0.05 mole) of 2-butene-1,4-diol, 6ml of butanone, and 0.06 g azobis(isobutyronitrile) was heated to 60° for 30 hours. The mixture became miscible after 2 hours. Two additional portions of catalyst were added during the course of the reaction. The mixture was diluted with water and the oil taken up in methylene chloride. The organic layer was washed with 5% sodium carbonate solution and water, then dried over magnesium sulfate, and the solvent evaporated to leave 10.5 g (74%) of a yellow wax, m.p. 55°–58°.

Anal. Calcd for $C_{14}F_{17}H_{13}O_2S$: % S, 5.64. Found: 5.87.

EXAMPLE 11

$C_8F_{17}CH_2CH_2SCH_2CHOHCH_2OH$

To a solution of 574 g (about one mole) of $C_8F_{17}CH_2CH_2I$ (about 2% $C_6F_{13}CH_2CH_2I$, 85% $C_8F_{17}CH_2CH_2I$, 9% $C_{10}F_{21}CH_2CH_2I$ and 4% $C_8F_{17}(CH_2)_4I$) in 600 ml of ethanol at 53° was added a solution of 68 g (1.03 mole of 85% potassium hydroxide and 115 g (1.06 mole) of 3-mercapto-1,2-propanediol in 350 ml of ethanol over 0.5 hour. The temperature rose to 68°. The mixture was then stirred at 55° for 4 hours, neutralized with acetic acid, and most of the solvent removed under reduced pressure on the rotary evaporator. The residue was taken up in ethyl acetate and washed with 5% sodium hydroxide solution, 5% sodium bicarbonate solution, and water, then dried over magnesium sulfate. Evaporation of the solvent left 490 g (89%) of solid product, m.p. 103°–106°, which contained 0.07% iodine by analysis. A 335 g sample was distilled collecting 309 g of a white crystalline solid, m.p. 102°–106°.

Anal. Calcd for $C_{13}F_{17}H_{11}O_2S$: % C, 28.17; H, 2.00; S, 5.78. Found: % C, 27.76; H, 1.89; S, 5.95.

EXAMPLE 12

Mixture of $C_8F_{17}CH_2CH_2SCH_2CHOHCH_2OH$, $C_8F_{17}(CH_2)_4SCH_2CHOHCH_2OH$ and $C_{10}F_{21}CH_2CH_2SCH_2CHOHCH_2OH$ Example 11 was repeated using 63 g (about 0.1 mole) of a mixture of 13% $C_8F_{17}CH_2CH_2I$, 37% $C_{10}F_{21}CH_2CH_2I$, 44% $C_8F_{17}CH_2CH_2CH_2CH_2I$, and 1% $C_6F_{13}CH_2CH_2I$. The yield of product, m.p. 122°–124°, was 49.6 g (86%).

EXAMPLE 13

$C_8F_{17}CH_2CHOHCH_2SCH_2CH_2OH$

To a solution of 16.0 g (0.205 mole) of 2-mercaptoethanol and 13.6 g (0.205 mole) of potassium hydroxide in 250 ml of ethanol was added 120.8 g (0.2 mole) of $C_8F_{17}CH_2CHICH_2OH$ (Example 5) in 125 ml of ethanol over 1 hour. After stirring overnight, the mixture was neutralized with acetic acid, the ethanol distilled off, and the residue taken up in ethyl acetate. After washing and drying, the solvent was evaporated to leave 98 g (88%) of crude product, m.pl 75°–80°. The NMP spectrum indicates that the product is largely $C_8F_{17}CH_2CHOHCH_2SCH_2CH_2OH$ formed by addition of percaptoethanol to an oxirane,

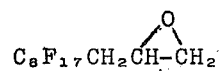

which results from the loss of hydrogen iodide from the starting iodo alcohol.

PREPARATION OF FLUORINATED POLYURETHANES

Isocyanate Assay

The isocyanates used were analyzed by ASTM procedure D1638-67T. For example, an 80/20 2,4-/2,6- tolylene diisocyanate mixture assayed 99.7%, isophorone diisocyanate assayed 99.0%, polymethylenepolyphenylene isocyanate (PAPI) assayed 97.5%, and phenyl isocyanate assayed 99.3%.

Hydroxyl Equivalent Weights of Alcohols, Diols and Triols

The hydroxyl equivalent weights of the polyols and fluorinated alcohols and diols were determined by a method based on that of Reed, Critchfield and Elder (Analytical Chem. 35, 571 (1963)) and ASTM procedure D1638-67T. The general procedure is given below.

About 0.012 equivalent of the hydroxyl-containing compound was placed in 50 ml of reagent grade tolylene and heated to reflux under nitrogen. About 15 ml of a distillate was removed to ensure complete removal of water as an azeotrope. The tolylene solution was cooled and 20 ml of 1.51N phenyl isocyanate in dry tolylene was added by pipette. The mixture was heated usually at 65° or 70° for several hours under nitrogen until reaction was complete. If reaction was slow, which was usually the case with the diols and triols, one drop of dibutyltin dilaurate was added and heating continued for about 3 hours further. After cooling, 2N dibutylamine in dry toluene (20 ml) was added by pipette. The mixture was stirred for 20 minutes at room temperature. 2-Propanol (80 ml) and 0.4 ml bromcresol green indicator solution (see ASTM D1638-67T) were added. Titration was carried out with either 1N or 0.5N HCl. A blank was run similarly using no hydroxyl compound and no phenyl isocyanate. The HCl equivalent, another blank, was determined in which all reagents were present but the hydroxyl compound. This value is the number of mls of HCl required to neutralize excess dibutylamine after reaction with phenyl isocyanate. The equivalent weight was calculated from the formula:

$$(\text{sample wt.}) \; 1000/[B-H-S] \; N$$

where
B=ml of HCl for blank
S=ml of HCl for sample
N=normality of HCl
H=HCl equivalent (ml)

Some of the compounds determined and their equivalent weights are listed below. The equivalent weights were run in duplicate and are reported as an average.

| Sample | Reaction Temp. (°C) | Reaction Time (Hr) | Reaction Time After Addition of Catalyst (Hr) | Average Equiv. Wt. |
|---|---|---|---|---|
| $C_8F_{17}(CH_2)_2S(CH_2)_2OH$ | 60 | 6½ | — | 548 |
| Dodecyl alcohol | 65 | 18 | — | 184 |
| $C_8F_{17}(CH_2)_2SC_3H_6OCH_2$-$CH(OH)CH_2OH$ (Example 8) | 70 | 22 | 4 | 298 |
| $C_8F_{17}CH_2CH_2SCH_2$-$CH(OH)CH_2OH$ | 70 | 26½ | 2½ | 285 |
| $C_8F_{17}(CH_2)_2SCH_2CH$-$(OH)CH_2OH$ (Example 11) | 70 | 27 | 3 | 281 |
| Niax Polyol PCP 0200 (Caprolactone polyol diol, Mol. wt 540) (Example 51) | 75 | 27 | 3 | 244 |
| Niax Polyol PCP 0240 (Caprolactone polyol diol, Mol. wt 2000) (Example 52) | 75 | 27 | 3 | 848 |
| $C_6F_{13}(CH_2)_2SCH_2CH$-$(OH)CH_2OH$ | 65 | 24 | 6 | 227 |
| $C_8F_{17}(CH_2)_2$ or $_4SCH_2CH(OH)CH_2OH$ (Example 12) | 65 | 24 | 6 | 296 |
| $C_8F_{17}CH_2CH_2CH_2OCH_2$-$CH(OH)CH_2OH$ (Example 7) | 65 | 23 | 3 | 261 |
| $C_8F_{17}CH_2CHOHCH_2$-$SCH_2CH_2OH$ (Example 13) | 65 | 25 | 3 | 294 |
| Niax Polyol PCP 0300 (Caprolactone polyol triol, Mol. wt 530) (Example 63) | 65 | 27 | 3 | 169 |
| Niax Polyol LHT 240 (a triol from propylene oxide and triol, Mol. wt 710) (Example 62) | 65 | 24 | 3 | 224 |
| Niax Polyol PPC-425 (polypropylene glycol, Mol. wt 425) (Example 59) | 65 | 24 | 3 | 206 |

Determination Of Conversion

During the course of preparing the polyurethanes herein it was advantageous to measure the degree of reaction to determine its progress and the number of equivalents of isocyante remaining. The measurement was carried out by a procedure simlar to that of the hydroxyl equivalent weight determination.

An accurately weighed sample was removed from the reaction mixture and diluted with 20 ml of spectro grade acetone, dried over molecular sieves. 2N Dibutylamine (10 ml) solution was added and the mixture stirred for 20 minutes. Isopropanol (80 ml) and the same indicator were added and the mixture titrated as above with hydrochloric acid. The conversion was calculated from the formula.

% conversion=(100/R) − [(B—S)N E 100/1000 W I R]

B, S, and N are the same as before. E is the equivalent weight of the diisocyanate used such as IPDI or TDI. W is the weight of sample (based on approximately 0.005 equivalents available NCO). I is the fraction of the initial amount of diisocyanate by weight in the reaction. R is the fraction of all the isocyanate groups expected to have reacted up to this point.

Example 14

Tolylene diisocyanate (TDI) - trimethylolpropane (TMP) adduct

A solution of 13.4 g of redistilled trimethylolpropane in 30 g of acetone, dried over molecular sieves, was added to a solution of 52.2 g of 80/20 2,4-/2,6-tolylene diisocyanate in 167 g of methylchloroform, also dried over molecular sieves. The mixture was heated to 50° in a nitrogen atmosphere. The temperature rose to 60° and then returned to 50°C. After heating for 23 hours, a 10.50 g sample was taken for analysis. The conversion was determined by the previously described procedure and found to be 99.8%. The reaction product is a 25% solution of an adduct formed from 3 moles of TDI and one of TMP.

Fluorinated polyurethane

A mixture of 50 g of the above solution, 15 g of $C_8F_{17}(CH_2)_2S(CH_2)_2OH$ and 72.5 g of methylchloroform was heated in a nitrogen atmosphere at 50°. After heating 22½ hours, 11.4 g was removed for analysis. Conversion was 79.8%. A catalyst, dibutyltin di-2-ethylhexoate (0.02g) was added and heating continued for about 2 hours more at which point the conversion was 116.5%. 2-Ethyl-1-hexanol and 2-butanone oxime in methylchloroform were added and heating continued for 3 hours. Infrared analysis indicated that all isocyanate groups had reacted and the reaction was complete. The resulting solution was analyzed and found to contain 4.95%F by weight.

Example 15

Isophorone diisocyanate (IPDI) - trimethylolpropane (TMP) adduct

Under a nitrogen atmosphere 43.6 g (0.333 mole) of redistilled TMP, 40 g 2-butanone (dried over molecular sieves) and 25 g of Chlorothene NU (Dow. $CH_3CCl_3$, dried over molecular sieves) were heated until most of the TMP dissolved. Chlorothene NU (113 g) and 222 g (1.0 mole) IPDI were added and the mixture heated 1 hour at 60° and about 3 hours at 90°. A 4 g sample was taken for analysis. Conversion was 79%. Heating was continued for another 1.75 hours and then let stand over the weekened. The conversion at this point was 92%.

Preparation of fluorinated polyurethane

A mixture of 24.6 g (0.0185 mole) of the IPDI-TMP adduct, 15.8 g $C_8F_{17}(CH_2)_2S(CH_2)_2OH$ (hydroxyl equivalent weight 548), and 112.7 g dry Chlorothene NU was heated under nitrogen for 36 hours at 80°. A sample (14.40 g) was taken for analysis. Conversion was 98.1% The reaction was heated overnight at 80° and a second sample (13.64g) was taken for analysis. Conversion was 100.2%.

One fourth of the NCO groups added as IPDI remained unreacted. These were unreacted. These were reacted with 2-butanone oxime and 2-ethyl-1-hexanol. 2-Butanone oxime (0.4005 g) in 3 g of dry Chlorothene NU was added and the mixture heated 19 hours at 80° under nitrogen. 2-Ethyl-1-hexanol (2.40 g) and 6.3 g of Chlorothene NU were added and heating continued for 24 hours. Reaction was not complete. A drop of dibutyltin dilaurate was added and heating was continued for 4 hours at 75°. Infrared analysis showed no unreacted isocyanate present. Fluorine analysis of the solution was 5.78%F.

Examples 16–50

Following the procedure of Example 15 other fluorinated polyurethanes were prepared from the polyols, trimethylolpropane, pentaerithrytol and dipentaerythritol. The fluorinated alcohol used was a mixture of about 5% $C_6F_{13}(CH_2)_2S(CH_2)_2OH$, 80% $C_8F_{17}(CH_2)_2S(CH_2)_2OH$, 7% $C_{10}F_{21}(CH_2)_2S(CH_2)_2OH$, and 5% $C_8F_{17}(CH_2)_4S(CH_2)_2OH$. The hydroxyl equivalent weight was 548. Table I lists the polyurethanes prepared from trimethylolpropane; Table II those from pentaerythritol; Table III those from dipentaerythritol.

TABLE I

Fluorinated Polyurethanes from Trimethylolpropane and $R_fCH_2CH_2SCH_2CH_2OH$

| Example | TMP[a] (moles) | Diisocyanate (moles) | $R_f$alc (moles) | Blocking Agent (moles) | Aliphatic alc (moles) | Cross-Linking Agent (moles) | % F of Final Solution of Product |
|---|---|---|---|---|---|---|---|
| 16 | 1 | 3 IDI[c] | 1.5 | 0.6 2-BO | 0.9 2-EH[e] | — | 5.71 |
| 17 | 1 | 3 IPDI[b] | 1.5 | — | 1.5 2-EH | — | 5.44 |
| 18 | 1 | " | 1.5 | 0.3 2-BO | 1.2 2-EH | — | 5.78 |
| 19 | 1 | " | 1.5 | 0.6 2-BO | 0.9 2-EH | — | 6.23 |
| 20 | 1 | " | 1.5 | 1.2 2-BO | 0.3 2-EH | — | 5.62 |
| 21 | 1 | " | 2.0 | 1.0 2-BO | — | — | 8.80 |
| 22 | 1 | " | 2.4 | 0.6 2-BO | — | — | 8.74 |
| 23 | 1 | " | 1.5 | 0.3 2-BO | 0.9 2-EH | 0.3 NMEA[f] | 5.84 |
| 24 | 1 | " | 1.5 | 0.6 2-BO | 0.6 2-EH | 0.3 NMEA | 5.60 |
| 25 | 1 | " | 1.5 | 0.3 phenol | 1.2 2-EH | — | 5.13 |
| 26 | 1 | " | 1.5 | 0.6 phenol | 0.9 2-EH | — | 5.47 |
| 27 | 1 | " | 1.5 | 1.2 phenol | 0.3 2-EH | — | 4.84 |
| 28 | 1 | " | 1.5 | 0.3 phenol | 0.9 2-EH | 0.3 NMEA | 5.51 |
| 29 | 1 | " | 1.5 | 0.6 phenol | 0.6 2-EH | " | 5.19 |

3,872,058

TABLE I—Continued

Fluorinated Polyurethanes from Trimethylolpropane and $R_fCH_2CH_2SCH_2CH_2OH$

| Example | TMP[a] (moles) | Diisocyanate (moles) | $R_f$ alc (moles) | Blocking Agent (moles) | Aliphatic alc (moles) | Cross-Linking Agent (moles) | % F of Final Solution of Product |
|---|---|---|---|---|---|---|---|
| 30 | 1 | " | 1.5 | — | — | — | 6.40 |
| 31 | 1 | " | 1.5 | — | 0.3 2-EH | — | 5.97 |
| 32 | 1 | " | 0.78 | — | — | — | 4.36 |
| 33 | 1 | " | 1.5 | 1.2 2-BO[d] | 0.3 2-EH | 0.4 TEA[g] | 5.60 |
| 34 | 1 | " | 1.5 | 1.2 2-BO | 0.3 2-EH | 0.8 TEA | 5.60 |
| 35 | 1 | " | 1.5 | 1.2 2-BO | 0.3 2-EH | 0.4 TMP[a] | 5.60 |
| 36 | 1 | " | 1.5 | 1.2 2-BO | 0.3 2-EH | 0.8 TMP | 5.60 |
| 37 | 1 | " | 1.5 | 1.3 phenol | 0.3 2-EH | 0.4 TEA | 4.80 |
| 38 | 1 | " | 1.5 | 1.2 phenol | 0.3 2-EH | 0.8 TEA | 4.80 |
| 39 | 1 | " | 1.5 | 1.2 phenol | 0.3 2-EH | 0.4 TMP | 4.80 |
| 40 | 1 | " | 1.5 | 1.2 phenol | 0.3 2-EH | 0.8 TMP | 4.80 |

[a] TMP = Trimethylolpropane
[b] IPDI = Isophorone diisocyanate
[c] 80/20 2,4-/2,6- Tolylene diisocyanate
[d] 2-BO = 2-Butanone oxime
[e] 2-EH = 2-Ethyl-1-hexanol
[f] NMEA = N-methylethanolamine
[g] TEA = Triethanolamine Table II Fluorinated Polyurethanes from Pentaerythritol and $R_f(CH_2)_2S(CH_2)_2OH$

| Example | PET[a] (moles) | IPDI[b] (moles) | $R_f$ alc (moles) | Blocking Agent (moles) | Aliphatic alc (moles) | % F of Final Solution of Product |
|---|---|---|---|---|---|---|
| 41 | 1 | 4 | 2.0 | 1.0 2-BO[c] | 1.0 2-EH[d] | 6.11 |
| 42 | 1 | 4 | 2.5 | 1.0 2-BO | 0.5 2-EH | 6.77 |
| 43 | 1 | 4 | 3.0 | 1.0 2-BO | — | 8.54 |

[a] PET = Pentaerythritol
[b] IPDI = Isophorone diisocyanate
[c] 2-BO = 2-Butanone oxime
[d] 2-EH = 2-Ethyl-1-hexanol Table III Fluorinated Polyurethanes from Dipentaerythritol and $R_f(CH_2)_2S(CH_2)_2OH$

| Example | DPE[a] (moles) | IPDI[b] (moles) | $R_f$ alc (moles) | Blocking Agent (moles) | Aliphatic alc (moles) | Cross-Linking Agent (moles) | % F of Final Solution of Product |
|---|---|---|---|---|---|---|---|
| 44 | 1.0 | 6.0 | 3.0 | 2.0 2-BO[c] | 1.0 2-EH[d] | — | 5.69 |
| 45 | 1.0 | 6.0 | 3.5 | 2.0 2-CO | 0.5 2-EH | — | 6.47 |
| 46 | 1.0 | 6.0 | 4.0 | 2.0 2-BO | — | — | 7.18 |
| 47 | 1.0 | 6.0 | 4.5 | 1.5 2-BO | — | — | 7.46 |
| 48 | 1.0 | 6.0 | 3.5 | 0 | — | 2.5 EA[e,f] | 6.02 |
| 49 | 1.0 | 6.0 | 4.0 | 0 | — | 2.0 EA[g] | 6.65 |
| 50 | 1.0 | 6.0 | 4.5 | 0 | — | 1.5 EA[h] | 6.79 |

[a] DPE = Dipentaerythritol
[b] IPDI = Isophorone diisocyanate
[c] 2-BO = 2-Butanone oxime
[d] 2-EH = 2-Ethyl-1-hexanol
[e] EA = Ethanolamine
[f] 2.5 moles 2-butanone oxime blocked PAPI was added at end of reaction
[g] 2.0 moles of 2-butanone oxime blocked PAPI was added at end of reaction
[h] 1.5 moles 2-butanone oxime blocked PAPI was added at end of reaction Example 51

This example illustrates the procedure for preparing fluorinated polyurethanes for fluorinated diols.

Isophorone diisocyanate (IPDI) - Caprolactone polyol (PCP 0200) adduct

A mixture of 44.4 g IPDI (0.2 mole), 48.8 g (0.1 mole based on hydroxyl equivalent weight of 244) of Union Carbide Niax polyol PCP 200, Mol. Wt 540, (H-O)$(CH_2)_5C(O)O)_nR-(OCO(CH_2)_5)_nOH)$, where R is alkylene and 152.8 g Chlorothene NU was heated for 1 hour at 60° and then 26 hours at 80° under nitrogen. Analysis of a 14.1 g sample showed 94% conversion. Heating was continued for 16 hours further to complete the reaction.

Preparation of fluorinated polyurethane from PCP 0200 - IPDI adduct

A mixture of 2.471 g (0.0111 mole) IPDI, 6.35 g (0.0111 mole based on hydroxyl equivalent weight of 285) of $R_fCH_2CH_2SCH_2CHOHCH_2OH$ and 16.5 g of dry Chlorothene NU was heated at 65° for 12 hours under nitrogen. Analysis for a 5.08 g sample showed a conversion of 94.2%. (Theoretical, 100% for 1:1 adduct with one free NCO group).

To the remaining reaction mixture was added 1.705 g (0.00139 mole) of the PCP 0200-IPDI adduct and 2 g of dry acetone. The molar ratio of the fluorinated diol to the adduct is 12.8. The mixture was heated under nitrogen for 48 hours at 67°C. Analysis of a 5.07 g sample showed low conversion. Five grams of dry Chlorothene NU and one drop of dibutyltin dilaurate were added and the reaction mixture was heated overnight. 2-Butanone oxime (0.15 g) was added to block the remaining unreacted isocyanate groups. The mixture was heated for 5 hours and let stand at room temperature over the weekend. Infrared analysis showed no isocyanate band. Analysis of the solution gave 7.11% F.

Examples 52–63

The procedure of Example 51 was repeated to prepare a series of fluorinated polyurethanes from fluorinated diols. Table IV lists those prepared from the polyol diols, Union Carbide Niax polyol PCP 0200, Mol. wt 540; niax polyol PCP 0240, Mol. wt 2,000, H-O(($CH_2$)$_5$C(O)O)$_5$—R—(OCO($CH_2$)$_5$)OH where R is alkylene and Niax polyol PPG 425, Mol. 425, polypropylene glycol. Table V lists those prepared from the polyol triols, Union Carbide Niax polyol PCP 0300, Mol. wt 530, R[(OCH($CH_2$)$_5$)$_n$OH]$_3$ and Niax polyol LHT 240, Mol. wt 710, a triol from propylene oxide and a triol.

Example 64

This example illustrates the general method of application of the polyurethanes to textiles. Oil repellency and spray ratings were determined by AATCC method 118–1966 and 22-1967 respectively.

The solution of Example 15 was diluted to the required pad bath strength with methyl chloroform or trichloroethylene to give between 0.075 and 0.15 wt % F of the weight of dry cloth at 100% wet pickup. The resulting solution was applied by padding to 50/50 cotton/polyester poplin. The treated fabric was dried in an oven for 4.2 minutes at 180°–210°F and cured at 170°C for 2.85 minutes. The treated cloth showed an oil-repellency rating of 5 and a spray rating of 100.

Example 65

The procedure of Example 64 was carried out with several of the other polyurethanes prepared. The results are given in Table VI.

Table IV

Fluorinated Polyurethanes from Polyol Diols and Fluorinated Diols

| Example | PCP-IPDI Adduct[a] (moles) | R$_f$ Diol-IPDI Adduct[b] (moles) | Blocking Agent (moles) | % F of Final Solution of Product |
|---|---|---|---|---|
| 52 | 1.0 (PCP 0240) | 8.0 | 2.0 2-BO[c] | 4.39 |
| 53 | 1.0 (PCP 0240) | 12.0 | 2.0 2-BO | 4.88 |
| 54 | 1.0 (PCP 0240) | 16.0 | 2.0 2-BO | 5.98 |
| 55 | 1.0 (PCP 0200) | 12.8 | 2.0 2-BO | 7.11 |
| 56 | 1.0 (PCP 0200) | 19.4 | 2.0 2-BO | 9.76 |
| 57 | 1.0 (PCP 0200) | 39.0 | 2.0 2-BO | 14.98 |
| 58 | 1.0 (PCP 0200) | 12.8[d] | 2.0 PNP[e] | 14.81 |
| 59 | 1.0 (PPG 425)[f] | 8.0 | 2.0 PNP | 13.72 |

[a] A 1:2 adduct of Niax polyol PCP (caprolactone polyol) and IPDI (isophorone diisocyanate)
[b] R$_f$ diol is R$_f$CH$_2$CH$_2$SCH$_2$CHOHCH$_2$OH, 1:1 adduct with IPDI
[c] 2-BO = 2-Butanone oxime
[d] R$_f$ diol is R$_f$CH$_2$CH$_2$OCH$_2$CHOHCH$_2$OH (Example 7)
[e] PNP = p-Nitrophenol
[f] A 1:2 adduct of Niax polyol PPG 425 (polypropylene glycol)

Table V

Fluorinated Polyurethanes from Polyol Triols and Fluorinated Diols

| Example | Triol-IPDI Adduct (moles) | R$_f$ Diol-IPDI Adducts (moles) | Blocking Agent (moles) | % F of Final Solution of Product |
|---|---|---|---|---|
| 60 | 1.0 PCP 0300-IPDI adduct | 9.0[a] | 3 PNP[c] | 15.47 |
| 61 | 1.0 PCP 0300-IPDI adduct | 12.0[b] | 3 PNP | 13.78 |
| 62 | 1.0 LHT 240-IPDI adduct | 12.0[a] | 3 PNP | — |
| 63 | 1.0 PCP 0300 only | 12.0[a] | None[d] | 11.96 |

[a] R$_f$ diol is R$_f$CH$_2$CH$_2$SCH$_2$CHOHCH$_2$OH
[b] R$_f$ diol is R$_f$CH$_2$CH(OH)CH$_2$SCH$_2$CH$_2$OH (Example 13)
[c] PNP = p-Nitrophenol
[d] Product is terminated in OH groups. 3.0 equivalents of 2-butanone oxime blocked PAPI were added.

Textile Application

The fluorinated polyurethane strain repellents of the invention are primarily intended for use in applications in which a substrate is treated with an organic solution of the stain repellent. The solutions are usually applied by padding or spraying. The use of solvent systems is often used in treatment of home furnishings, upholstery material and wool or in situations were water pollution must be prevented. Hence it is convenient to prepare them in chlorinated solvents such as methyl chloroform.

Aqueous emulsions may be prepared using nonionic or cationic surfactants. These emulsions are used in the usual manner to treat textiles etc.

Table VI

| Polyurethane | % F, owf[a] | Oil Repellency | Spray Rating |
|---|---|---|---|
| Example 16 | 0.11 | 4 | 90 |
| 17 | 0.09 | 4 | 80 |
| 19 | 0.12 | 5 | 80 |
| 22 | 0.11 | 5 | 80 |
| 23 | 0.09 | 4 | 80 |
| 24 | 0.13 | 4 | 80 |
| 30 | 0.12 | 4 | 80 |
| 33[b] | 0.09 | 5 | 80 |
| 33[b] | 0.06 | 4 | 80 |
| 44 | 0.07 | 3 | 80 |

[a] % wt F on weight of cloth as determined by fluorine analysis
[b] cured for 4 minutes instead of 2.85 minutes

What is claimed is:

1. A fluorinated polyurethane selected from the class consisting of (A) the reaction product formed by sequentially reacting (a) an organic polyol containing 2 to 6 primary or secondary —OH functions, the polyol having a molecular weight not exceeding about 2000 and free of repeating —$OCH_2CH_2$— units with (b) $Z'$ moles ($Z'$=3-6) of an organic diisocyanate to form the adduct $J(NCO)_{Z'}$ wherein J contains three to six urethane functions and then reacting $J(NCO)_{Z'}$ with (c) $0.3Z'$ to $Z'$ moles of $R_fC_nH_{2n-a}(OH)_aXR'(OH)_b$ wherein $R_f$ is a perfluoroalkyl group of 4-16 carbon atoms, X=O or S, R' is a di- or trivalent saturated group which may contain in addition to carbon and hydrogen, an ether or thioether linkage, $n$=1-11, $a$=0-1, $b$=1-2, $a+b$=1, per mole of $J(NCO)_{Z'}$ and optionally reacting any residual isocyanate functions with (d) a component selected from the class consisting of (1) an aliphatic alcohol of 1-18 carbon atoms; (2) an isocyanate blocking agent; (3) a chain extender of the group low molecular weight diamines and (4) a cross-linking agent selected from the class consisting of diols and triols and (B) the reaction product formed by reacting (a') an organic polyol selected from the group consisting of diols and triols, the polyol having a molecular weight not exceeding about 2,000 and free of repeating —$OCH_2CH_2$— units with (b') 2-43 moles of an organic diisocyanate per mole of (a') and (c') 2-40 moles of $R_fC_nH_{2n-a}(OH)_aXR'(OH)_b$ wherein $a+b$=2 per mole of (a') and reacting the product of (a'), (b') and (c') with 0-3 moles of (d') per mole of (a') which has the values assigned to (d) aforesaid.

2. A composition according to claim 1 wherein the fluorinated hydroxyl compound contains an $R_f$ group of 6-12 carbon atoms.

3. A composition according to claim 1 wherein the fluorinated hydroxyl compound is $R_f(CH_2)_3OCH_2CH_2OH$.

4. A composition according to claim 1 wherein the fluorinated hydroxyl compound is $R_f(CH_2)_{2-4}S(CH_2)_{2-3}OH$.

5. A composition according to claim 1 wherein the fluorinated hydroxyl compound is $R_f(CH_2)_{2-4}S(CH_2)_{11}OH$.

6. A composition according to claim 1 wherein the fluorinated hydroxyl compound is $R_f(CH_2)_3OCH_2CHOHCH_2OH$.

7. A composition according to claim 1 wherein the fluorinated hydroxyl compound is $R_f(CH_2)_{2-4}SC_3H_6OCH_2CHOHCH_2OH$.

8. A composition according to claim 1 wherein the fluorinated hydroxyl compound is $R_f(CH_2)_{2-4}SC_3H_6CH(CH_2OH)_2$.

9. A composition according to claim 1 wherein the fluorinated hydroxyl compound is $R_f(CH_2)_{2-4}SCH(CH_2OH)CH_2CH_2OH$.

10. A composition according to claim 1 wherein the fluorinated hydroxyl compound is $R_f(CH_2)_{2-4}SCH_2CHOHCH_2OH$.

11. A composition according to claim 1 wherein the fluorinated hydroxyl compound is $C_8F_{17}CH_2CH_2SCH_2CHOHCH_2OH$.

12. A composition according to claim 1 wherein the diisocyanate is tolylene diisocyanate.

13. A composition according to claim 1 wherein the diisocyanate is isophorone diisocyanate.

* * * * *

UNITED STATES PATENT OFFICE
CERTIFICATE OF CORRECTION

PATENT NO. : 3,872,058
DATED : March 18, 1975
INVENTOR(S) : John T. Gresham

It is certified that error appears in the above-identified patent and that said Letters Patent are hereby corrected as shown below:

Cover page, at line designated [73] Assignee:, "AMC" should read --FMC--; cover page, in the Abstract, second column, line 5, "B(NCO)$_z$'" should read --J(NCO)$_z$'--; cover page, in the Abstract, second column, line 8, "r$_f^z$" should read --R$_f$--; cover page, in the Abstract, second column, line 10, "alkyl group of 4-16 carbon atoms, X=O or S, R' is a" should be deleted. Column 1, line 38, "wherein B contains" should read --wherein J contains--. Column 3, line 36, "R$_f$(CH$_2$)$_2$CC$_3$H$_6$OCH$_2$CHOHCH$_2$OH" should read --R$_f$(CH$_2$)$_2$SC$_3$H$_6$OCH$_2$CHOHCH$_2$OH--. Column 10, line 36, "(0.255 mole)" should read --(0.225 mole)--. Column 12, line 53, "NMP" should read --NMR--. Column 16, line 29, "These were unreacted." should be deleted. Columns 17-18, Table III, Example 45, under column heading "Blocking Agent (moles)", "2.0 2-CO" should read --2.0 2-BO--; columns 17-18, Table III, footnote "c", "2-Butanono" should read --2-Butanone--. Column 19, line 16, "Mol. 425" should read --Mol. wt. 425--. Column 22, lines 16-17, Claim 7, "R$_f$(CH$_2$)$_{2-4}$SC$_3$H$_6$OCH$_2$CHOHCH$_2$OH" should read --R$_f$(CH$_2$)$_{2-4}$SC$_3$H$_6$OCH$_2$CHOHCH$_2$OH--.

Signed and Sealed this

Twenty-second Day of March 1977

[SEAL]

Attest:

RUTH C. MASON
Attesting Officer

C. MARSHALL DANN
Commissioner of Patents and Trademarks